Sept. 27, 1927.
W. P. JOHNSON
1,643,501
FEED TROUGH FOR POULTRY CARS
Filed Feb. 19. 1926   2 Sheets-Sheet 2
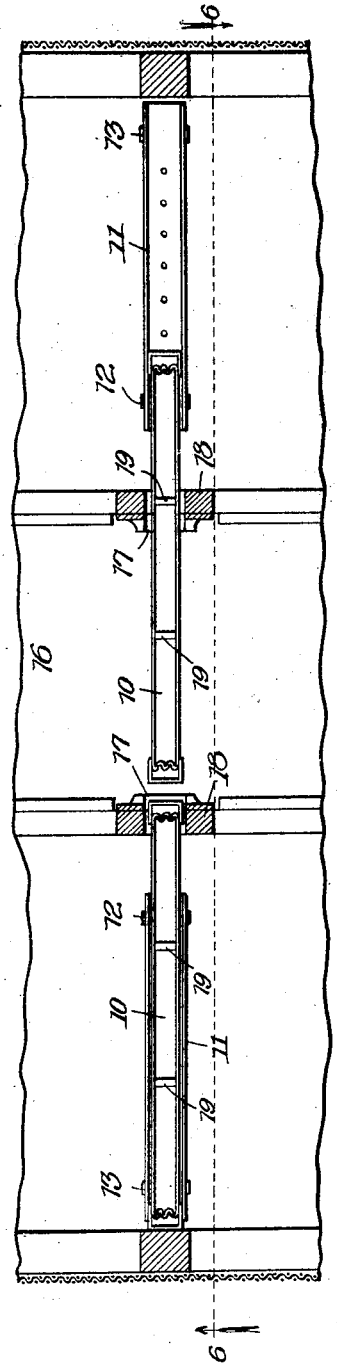
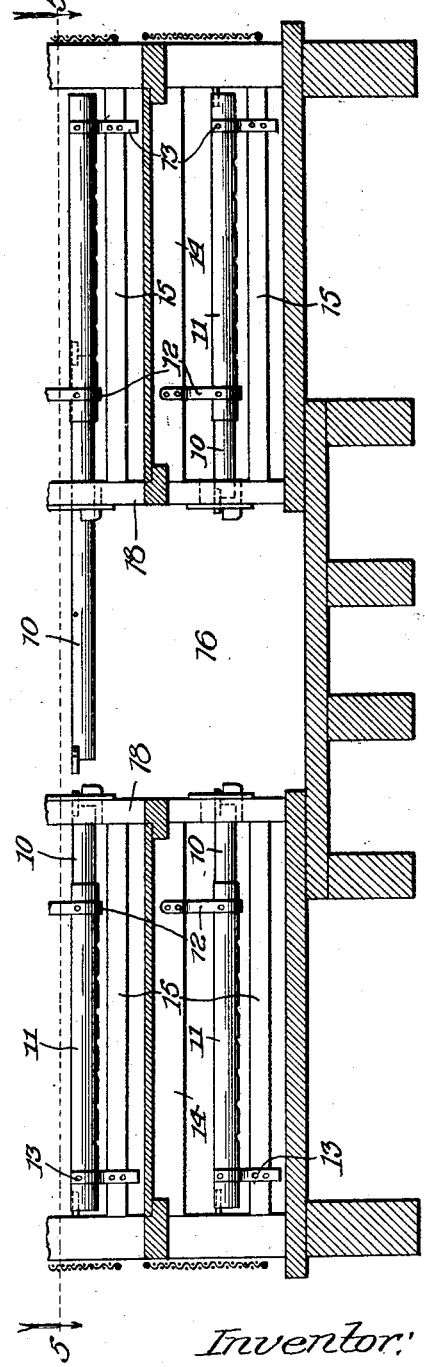
Inventor:
Waldo P. Johnson, Patented Sept. 27, 1927.

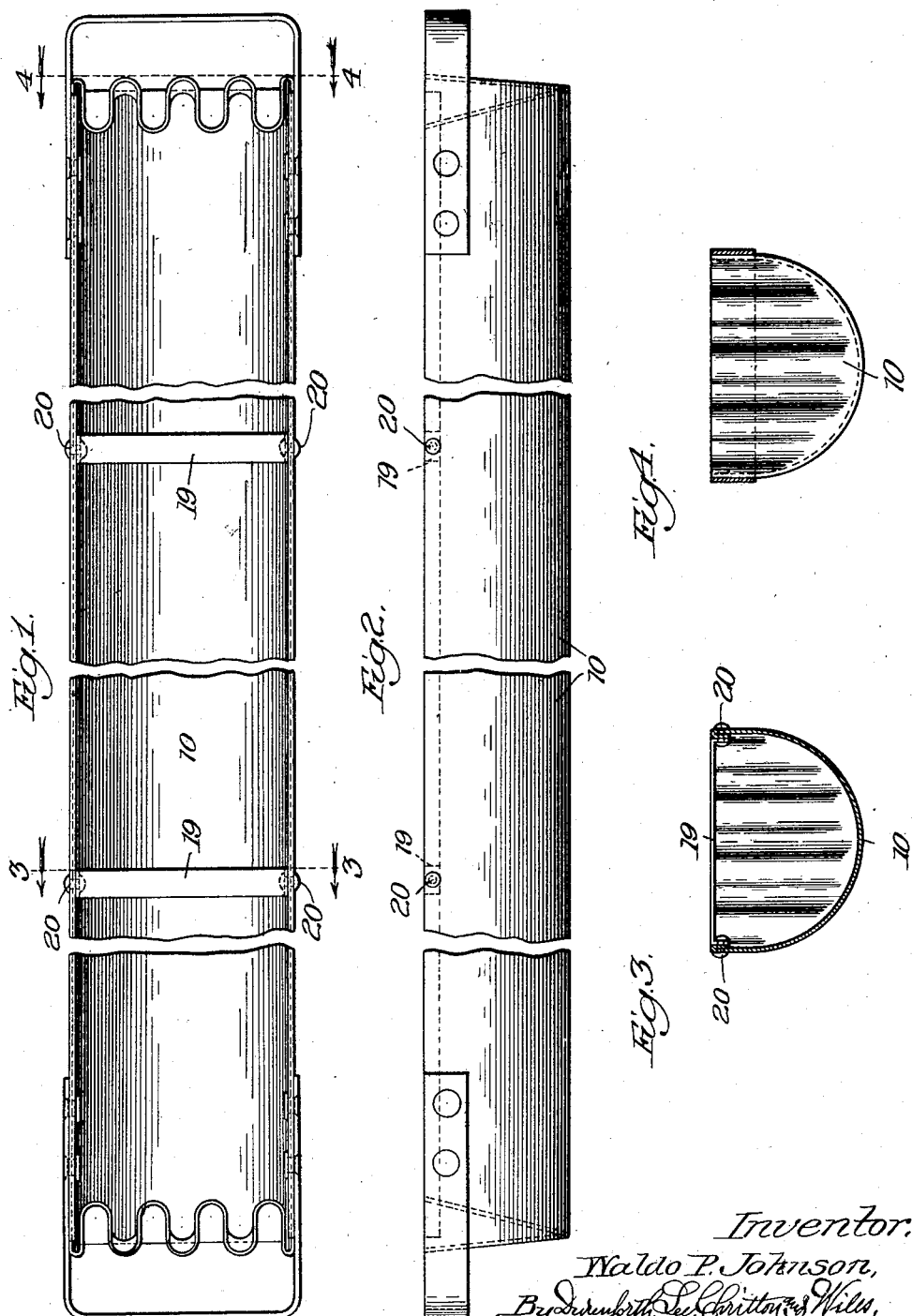

1,643,501

UNITED STATES PATENT OFFICE.

WALDO P. JOHNSON, OF CHICAGO, ILLINOIS.

FEED TROUGH FOR POULTRY CARS.

Application filed February 19, 1926. Serial No. 89,381.

This invention relates to feed troughs for poultry cars and the like. One of the features of the invention is the making of a trough that is stiff and rigid and braced so that it cannot easily be bent or warped to aid in removing it from its guides.

Other features and advantages will appear more fully as I proceed with my specification.

In that form of device embodying the features of my invention as shown in the accompanying drawings, Figure 1 is a top plan view, Fig. 2 is a view in side elevation, Fig. 3 is a view taken as indicated on the line 3 of Fig. 1, Fig. 4 is a view taken as indicated on the line 4 of Fig. 1, Fig. 5 is a partial horizontal section of the line 5 in Fig. 6 showing the trough applied to a poultry car, and Fig. 6 is a partial vertical section on the line 6 of Fig. 5.

The invention is particularly applicable to poultry cars provided with tiers of coops on each side forming a central aisle between. In this kind of a car, between these adjacent coops in each tier, it is customary to arrange a feed trough. Such feed troughs are ordinarily mounted in guides and are slidable thereon so that each trough may be drawn part-way into the central aisle in order to give better access to the same for filling, cleaning and the like.

In the practice of my invention, the troughs are made long enough and the central aisle is narrow enough so that a trough cannot be completely removed from its guide into the central aisle by merely pulling it out. That is, the end of the trough will strike the opposite side of the aisle if pulled out straight before its outer end is released from the guide. It will seem, however, that if a trough should be given a series of bends as it is being withdrawn from the guide, it might be possible to curve it down the aisle as it is drawn out so that after a sufficient number of bends have been given in the same general direction, the trough can be completely removed from the guide and carried away. In order to make the trough stiff and rigid and prevent it from being bent in this manner in order to remove it from the guide, I reinforce it by means of cross braces.

Since the construction and operation of each of the troughs are similar, I will describe in detail but one.

As shown in the drawings, 10 indicates a trough which is carried in a hollow guideway 11 which is supported by means of brackets 12 and 13 on the partition members 14 and 15 which lie between adjacent coops in the same tier. These coops are arranged in tiers, one set on each side of the central aisle 16. It will be seen by Fig. 5 that the central aisle 16 is so narrow that if a trough is drawn into it, it will strike the opposite side of the aisle before its outer end is free from the guide.

The trough 10 extends through an opening 17 in the aisle post 18 so that it can be partially withdrawn into the aisle as shown on the right hand side of Fig. 5 while the trough on the left hand side is shown pushed back into the space between the coops. In order to prevent the bending or warping of a trough in an attempt to completely take it out of the coop, I provide a series of braces 19 which are placed sufficiently close together throughout the length of the trough to prevent it from being thus bent or warped. It will be seen that the bending or warping referred to tends to collapse the trough or make these sides approach each other and the braces 19 preventing its collapsing consequently prevent bending or warping of the trough. The braces 19 may be secured to the sides of the trough by any suitable means as, for example, by the rivets 20.

While I have shown and described but a single embodiment of this invention, it is to be understood that it is capable of many modifications. Changes therefore in the construction and arrangement may be made which do not depart from the spirit and scope of the invention as disclosed in the appended claim.

Throughout this specification and claim, in speaking of drawing the trough into the aisle, or withdrawing the trough, I refer only to the endwise sliding movement of the trough in the guide permitting it to be drawn into the aisle until its inner end strikes the opposite side of the aisle. When in such position, however, it is to be distinctly understood that the outer end of the trough is still in the guide and held thereby so that the trough cannot be completely removed or taken away. In speaking of removing the trough, I refer to the complete extraction of the trough from the guide so that it can be entirely lifted out and carried away from the car.

I claim:

In a poultry car, tiers of coops on each side forming a central aisle, troughs between adjacent coops in the same tier, guiding means permitting the troughs to be drawn into the aisle, the said guiding means snugly fitting the troughs and the troughs being longer than the width of the aisle so that they are not removable thereinto, and cross braces for reinforcing said troughs to prevent their being bent laterally to permit their removal from said guiding means.

WALDO P. JOHNSON.